(12) United States Patent
Kong et al.

(10) Patent No.: US 6,706,342 B2
(45) Date of Patent: Mar. 16, 2004

(54) POLYMERIC LABELS

(75) Inventors: Dan-Cheng Kong, Fairport, NY (US); Terry Otto Jensen, Canandaigua, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 85 days.

(21) Appl. No.: 09/790,131

(22) Filed: Feb. 21, 2001

(65) Prior Publication Data

US 2002/0114936 A1 Aug. 22, 2002

(51) Int. Cl.$^7$ ............... B32B 27/08; B29D 22/00; G09F 3/10; B65D 85/00
(52) U.S. Cl. ............ 428/34.1; 428/516; 428/910; 40/638; 206/459.5
(58) Field of Search .................. 428/515, 516, 428/910, 34.1; 40/310, 312, 638; 206/459.5

(56) References Cited

U.S. PATENT DOCUMENTS

| | | | |
|---|---|---|---|
| 4,252,851 A | * 2/1981 | Lansbury et al. | 428/334 |
| 4,532,189 A | * 7/1985 | Mueller | 264/171.28 |
| 4,837,075 A | 6/1989 | Dudley | 428/220 |
| 5,071,686 A | * 12/1991 | Genske et al. | 428/213 |
| 5,108,844 A | * 4/1992 | Blemberg et al. | 264/173.13 |
| 5,151,309 A | 9/1992 | Dollinger | 428/40 |
| 5,314,749 A | * 5/1994 | Shah | 206/497 |
| 5,376,417 A | * 12/1994 | Amano et al. | 283/81 |
| 5,451,283 A | 9/1995 | Josephy et al. | 156/229 |
| 5,560,997 A | * 10/1996 | Kotani et al. | 428/195 |
| 5,616,384 A | 4/1997 | Goettmann et al. | 428/36.1 |
| 5,849,419 A | 12/1998 | Josephy et al. | 428/516 |
| 5,885,721 A | * 3/1999 | Su et al. | 264/280 |
| 6,245,418 B1 | * 6/2001 | Freedman | 428/220 |
| 6,436,496 B1 | * 8/2002 | Rackovan et al. | 206/497 |

* cited by examiner

*Primary Examiner*—Paul Thibodeau
*Assistant Examiner*—Kevin R Kruer
(74) *Attorney, Agent, or Firm*—Rick F. James

(57) ABSTRACT

A polymeric label comprising a core layer comprising at least about 50% by weight of a linear ethylene alpha-olefin copolymer and at least about 5% by weight of a propylene copolymer; and a first skin layer comprising a propylene copolymer.

30 Claims, 1 Drawing Sheet

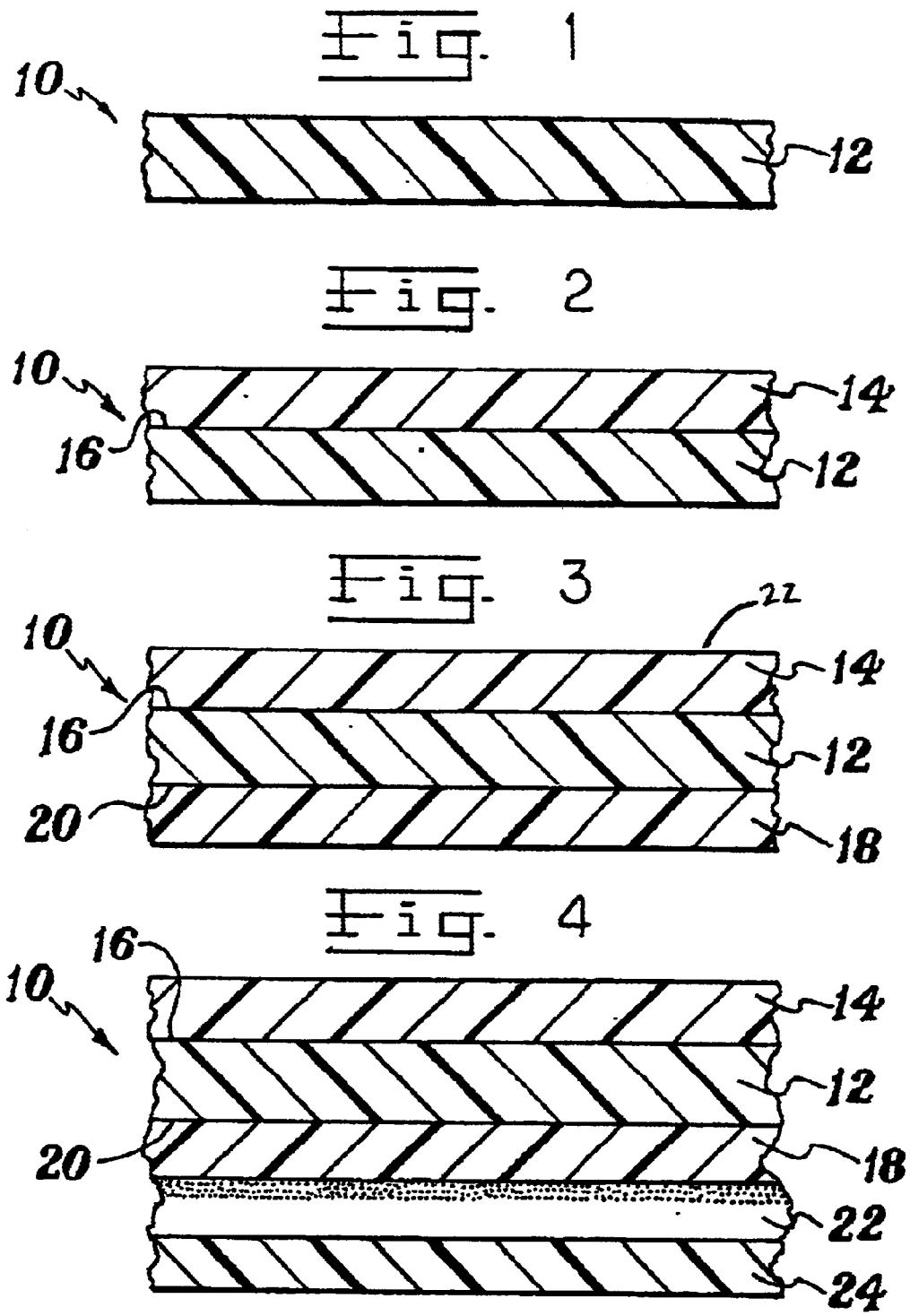

POLYMERIC LABELS

BACKGROUND OF THE INVENTION

1. Field of the Invention

This invention relates to labels generally, and more specifically but without limitation to deformable labels and to films for making such labels. In one aspect the invention relates to the use of such labels on squeezable or otherwise deformable substrates, where deformability and a resistance of the label to damage from cracking, tearing, creasing, wrinkling or shrinking due to deformation of the underlying substrate is desired. In another aspect the invention relates to such labels which possess the beneficial properties of the known polyethylene labels, but which exhibit improved dispensability and die-cuttability so that the labels may be conveniently applied to deformable substrates with modern labeling equipment.

2. Description of the Prior Art

In many label applications, it is desirable that the label stock from which the labels are cut from a film of polymeric material rather than paper. Polymeric film can provide properties lacking in paper, such as durability, strength, water resistance, abrasion resistance, gloss, transparency and other properties. Obviously, the polymeric material must meet the practical requirements of commercial manufacture and use. Material costs must be competitive. The film must be formable by a suitable commercial process such as cast film extrusion or blown film extrusion, requiring that the molten film material be flowable to the correct degree to accomplish proper film formation. The formed film must be capable of hot-stretching without deleterious effect, since it is generally advantageous to hot-stretch and anneal the formed film, so as to orient the film and impart a stiffness to the film that is different in machine and cross directions. The film must have a printable face and be die-cuttable and matrix-strippable when used in a pressure-sensitive label construction. The labels should have enough "give" or flexibility to conform well to the substrates or containers on which they are used (a particularly demanding requirement when the labels are applied to flexible substrates such as squeezable plastic containers, for example shampoo bottles and condiment containers, but also a requirement with respect to rigid substrates which may have irregularities in their surfaces, such as glass bottles). On the other hand, labels cut from the film should be sufficiently dimensionally stable to maintain print registration and stiff enough to allow them to be properly dispensed as an in-mold label, or to dispense properly past a peel plate or peel-back edge, over which the liner or carrier is stripped, at speeds which are high enough to be commercially viable. Dispensing at these speeds generally requires a machine-direction (MD) stiffness of between 10 and 60 Gurley (as measured per TAPPI Gurley stiffness test T543pm). For good conformability, cross-direction (CD) Gurley should not exceed about 0.75 times MD Gurley.

Olefin blends have been found in many respects to be a preferred material to meet the demands of polymeric die-cut label manufacture. The relatively low cost of the olefinic resins, and their high strength allowing for low caliper film, tend to minimize overall material cost. Hot-stretched polypropylene and/or polyethylene provides stiffness in the machine direction even at relatively low-caliper thicknesses for adequate print registration and dispensing while providing sufficiently low tensile modulus and particularly sufficiently high elongation in the cross direction to allow good conformability.

Olefin blends have been found useful to produce, on an economical basis, printable 3.5 mil coextruded labels die-cut from biaxially hot-stretched film that are durable, strong and water-resistant, and that generally have good structural and surface properties and performance characteristics, and such labels have been manufactured and sold prior to the present invention. Biaxial stretching also makes an important contribution to performance by creating substantial differentials between machine direction (MD) and cross direction (CD) stiffnesses, tensile moduli, elongations, and other properties.

U.S. Pat. No. 4,837,075 discloses a label particularly adapted for use in in-mold labeling of blow-molded polyethylene containers comprising a heat activatable ethylene polymer adhesive layer and a surface printable layer with optional intermediate layers to provide interlayer adhesion and recycle of reground labels. The patent relates to labels, especially to labels that are particularly adapted for use in in-mold labeling of blow-mold polyethylene containers. More particularly, the patent relates to a coextruded plastic film label for use in such in-mold labeling applications. U.S. Pat. No. 4,837,075 is incorporated herein by reference.

U.S. Pat. No. 5,151,309 discloses a film facestock useful for making labels for use on deformable substrates, which labels are die-cuttable and dispensable, the film facestock including a layer of a polymer blend which includes an ethylenic material, a styrenic material, and a compatibilizing material. The patent relates to a compatibilized blend of certain styrenic materials and certain ethylenic materials, when used in the proper amounts to produce a film facestock of a given thickness, which provide a label with adequate resistance to cracking, tearing, creasing, wrinkling and shrinking upon deformation of a substrate to which the label is joined, with the printability, chemical and dimensional stability of previously known polyethylene labels while having the desirable die-cuttability and dispensability properties of the vinyl films. U.S. Pat. No. 5,151,309 is incorporated herein by reference.

U.S. Pat. No. 5,451,283 discloses extruded uniaxially oriented films useful in label manufacture and formed from blends of olefinic base materials and soft polar additives such as ethylene vinyl acetate (EVA) where the physical properties are changed in a directionally selective manner that improves abrasion resistance while preserving conformability by use of compatibilizers or coupling agents in the blends. Machine direction strength properties, including stiffness and tensile modulus, increase with little or no degradation of cross-direction elongation, and with limited degradation of cross-direction tensile modulus. The patent relates to the conformable labeling of flexible and rigid substrates such as squeeze bottles, glass bottles and the like, and to manufacture of die-cut labels for such uses from resinous film-forming materials which are blends of "soft" polar additives, such as ethylene vinyl acetate polymer (EVA), with low-cost olefinic base materials, particularly polypropylene, polyethylene, or combinations thereof. U.S. Pat. No. 5,451,283 is incorporated herein by reference.

U.S. Pat. No. 5,616,384 discloses an in-mold label material that is a nonwoven mat of fibers having one side fused with the outer surface of a polymeric container and the other side coated with a pigment-containing latex suitable for printing thereon. The label paper is manufactured from commercially available fibers combined in water into a homogeneous mixture and then formed into a mat employing a wet-lay process. For use with polyethylene containers, the label may be a web consisting of 88–100% polyethylene fibers and 0–15% polyvinyl alcohol fibers or 70–100% polyethylene fibers, 0–15% polyvinyl alcohol fibers and 0–30% polypropylene fibers. For use with polyester containers, the label may be a web consisting of 50–90% polyester staple fibers, 10–40% bicomponent polyester/co-polyester, core/sheath binder fibers and 0–10% polyvinyl alcohol binder fibers thermally bonded together. The non-woven web of fibers has a pigmented coating. After the material has been cut into labels, the labels may be applied to the blow-molded containers in-mold without the use of an adhesive material using a conventional in-mold labeling technique or post-mold using adhesive. It is an object of the patent to provide a non-film polymeric label adapted to be used in-mold labeling of blow-molded containers made of polymeric material. U.S. Pat. No. 5,616,384 is incorporated herein by reference.

U.S. Pat. No. 5,849,419 discloses extruded uniaxially oriented films useful in label manufacture and formed from blends of olefinic base materials and soft polar additives such as ethylene vinyl acetate (EVA) where the physical properties are changed in a directionally selective manner that improves abrasion resistance while preserving conformability by use of compatibilizers or coupling agents in the blends. Machine direction strength properties, including stiffness and tensile modulus, increase with little or no degradation of cross-direction elongation, and with limited degradation of cross-direction tensile modulus. The patent relates to the conformable labeling of flexible and rigid substrates such as squeeze bottles, glass bottles and the like, and to manufacture of die-cut labels for such uses from resinous film-forming materials which are blends of "soft" polar additives, such as ethylene vinyl acetate polymer (EVA), with low-cost olefinic base materials, particularly polypropylene, polyethylene, or combinations thereof. U.S. Pat. No. 5,849,419 is incorporated herein by reference.

Plastic containers are used extensively in the packaging industry to carry fluids such as beverages, soap, cream, and oils. These containers are typically formed polyethylene, polypropylene, polyvinyl chloride, and other flexible plastics. The containers are deformable in their shape when a force is applied. When the force is removed, the containers return to their original shape. Conventional paper labels are not suitable for the deformable containers because paper labels can not deform with the containers and leave wrinkling and tearing during squeezing the containers. Plastic labels made of polyvinyl chloride, are deformable but are not good for the environment. The labels of this invention are deformable and are better for the environment than polyvinyl chloride labels.

SUMMARY OF THE INVENTION

One embodiment of this invention is a polymeric label comprising a core layer comprising at least about 50% by weight of a linear ethylene alpha-olefin copolymer and at least about 5% by weight of a propylene copolymer, and a skin layer comprising a propylene copolymer.

Another embodiment of this invention is a polymeric label applied to a squeezable plastic container comprising a core layer comprising at least about 50% by weight of a linear ethylene alpha-olefin copolymer and at least about 5% by weight of a propylene copolymer, and a skin layer comprising a propylene copolymer.
Advantages of the polymeric label include one or more of the following:
1. When attached to a squeezable plastic container, the label is deformable with the container when the container is squeezed.
2. When attached to a squeezable plastic container, the label does not wrinkle when the container is squeezed.
3. When attached to a squeezable plastic container, the label does not tear when the container is squeezed.
4. A label material that is better for the environment than a polyvinyl chloride label.
5. A label that can be recycled with the plastic container without having to be removed.

BRIEF DESCRIPTION OF THE DRAWINGS

FIG. 1 is a cross-sectional view of a film facestock constructed in accordance with the present invention and consisting of a blend layer as previously described.

FIG. 2 is a cross-sectional view of the film facestock of FIG. 1, with a skin layer added.

FIG. 3 is a cross-sectional view of the film facestock of FIG. 1, with skin layers laminated or otherwise held adjacent opposing surfaces of the blend layer of the film.

FIG. 4 is a cross-sectional view of the label shown in FIG. 3, as attached to a given substrate.

DETAILED DESCRIPTION OF THE DRAWINGS

Referring now to the accompanying FIGS. 1–4, the present invention is illustrated in its various aspects.

Referring first to FIG. 1, depicts a polymeric label 10 which consists of a core layer 12 of a polymer blend, the blend including a first material comprising a linear ethylene alpha-olefin copolymer, and a second material comprising a propylene copolymer.

In one embodiment the first material comprising a linear ethylene alpha-olefin copolymer is selected from the group consisting of ethylene-butene, ethylene-octene, and ethylene-hexene.

In another embodiment, the first material comprising a linear ethylene alpha-olefin copolymer has a density from about 0.93 to about 0.95.

In another embodiment, the first material comprising a linear ethylene alpha-olefin copolymer comprises from about 10% to about 90% of a linear ethylene alpha-olefin copolymer with a density from about 0.93 to about 0.940; and from about 10% to about 90% of a linear ethylene alpha-olefin copolymer with a density from about 0.941 to about 0.95.

In another embodiment, the second material comprising a propylene copolymer is selected from the group consisting of propylene-ethylene copolymer, propylene-butene copolymer, ethylene-propylene-butene terpolymer, propylene-hexene copolymer, and mixtures thereof.

In another embodiment, the polymeric label 10 comprises between about 80% and about 95% of the first material comprising a linear ethylene alpha-olefin copolymer, and the polymeric label 10 comprises between about 5% and about 20% of the second material comprising a propylene copolymer.

The polymer blend comprises a substantially homogeneous mixture of the first and second materials, so that the core layer 12 in deformation and recovery behaves as if constructed of a single, uniform material. This relative uniformity of response may be particularly of concern where, as in FIG. 1, the polymeric label 10 comprises the core layer 12 and where the placement of the label, the character of the substrate, and the use of the substrate demand a uniformity of response.

It should be noted that the core layer 12 may contain other materials in addition to the first and second materials broadly described above, so long as these other materials do not unduly interfere with achieving the desired advantages which include one or more of the following: deformability, the label does not wrinkle, the label does not tear, environmentally friendly, and recyclable.

In another embodiment, the first and second materials together should comprise no less than about 60 percent by weight of the core layer 12.

In another embodiment, a conventional filler and pigment such as titanium dioxide may be added to the core layer 12 and may be desirable for printing or graphic reproduction purposes. Generally, from an economic viewpoint at least it has not been considered to be of any particular advantage to use more than about 10 percent by weight of titanium dioxide to achieve a white label suitable for printing, although greater amounts could be added for greater opacity so long as there is no undue interference with achieving the desired properties of the polymeric label 10.

As shown in FIG. 2, the polymeric label 10 of the present invention may comprise a first skin layer 14 held adjacent a first side 16 of the core layer 12, the skin layer 14 is comprised of a propylene copolymer.

In one embodiment the propylene copolymer of the skin layer 14 is selected from the group consisting of propylene-ethylene copolymer, propylene-butene copolymer, ethylene-propylene-butene terpolymer, propylene-hexene copolymer, and mixtures thereof. Although this embodiment has disclosed the use of a propylene copolymer, other materials may be suitable for the skin layer 14, but the materials and amounts of such materials selected should not, when incorporated into the skin layer 14, prevent the realization of all the goals of the present invention. The skin layer 14 may also contain materials such as titanium dioxide and may be held adjacent the first side 16 of the core layer 12 by any suitable means.

In one embodiment the skin layer 14 is held in place by an adhesive. In a second embodiment, the first skin layer 14 is formed by melt coextrusion with the core layer 12. The word "adjacent" is used above to describe the spatial relationship of the first skin layer 14 and the first side 16 of the core layer 12 and to indicate that intervening layers as of adhesive are contemplated, although as noted in the second embodiment, the first skin layer 14 could be in a face-to-face relationship with the first side 16 of the core layer 12.

An embodiment of the polymeric label 10 of the present invention, as shown in FIG. 3, may also employ a second skin layer 18 held adjacent a second side 20 of the core layer 12 wherein the second skin layer 18 is comprised of a propylene copolymer.

In one embodiment the propylene copolymer of the second skin layer 18 is selected from the group consisting of propylene-ethylene copolymer, propylene-butene copolymer, ethylene-propylene-butene terpolymer, propylene-hexene copolymer, and mixtures thereof. Although this embodiment has disclosed the use of a propylene copolymer, other materials may be suitable for the second skin layer 18, but the materials and amounts of such materials selected should not, when incorporated into the skin layer 18, prevent the realization of all the goals of the present invention. The second skin layer 18 may also contain materials such as titanium dioxide and may be held adjacent the second side 20 of the core layer 12 by any suitable means.

In one embodiment the second skin layer 18 is held in place by an adhesive. In a second embodiment, the second skin layer 18 is formed by melt coextrusion with the core layer 12. The word "adjacent" is used above to describe the spatial relationship of the second skin layer 18 and the second side 20 of the core layer 12 and to indicate that intervening layers as of adhesive are contemplated, although as noted in the second embodiment, the second skin layer 18 could be in a face-to-face relationship with the second side 20 of the core layer 12.

In another embodiment of the invention neither the first skin layer 14 nor the second skin layer 18 contains titanium dioxide, and the titanium dioxide pigment is contained only in the core layer 12. It has been found in this regard that titanium dioxide tends to build up on a die lip over time where it is not isolated in the core layer 12 of the polymeric label 10, and eventually breaks off into the label. As a consequence, where the titanium dioxide has not been so isolated, it has been necessary to periodically stop production of the label and remove the materials built up on the die lip.

In another embodiment, the first skin layer 14 and the second skin layer 18 will be essentially identically constructed and of the same thickness, so that the differences in the behavior of the first skin layer 14 and the second skin layer 18 when deformed and when recovering from deformation which are attributable to any differences in composition or thickness do not tend to aid the formation of wrinkles when the polymeric label 10 of FIG. 3 is used as part of a label on a deformable substrate. Differences in composition and thickness which do not significantly adversely affect the overall performance of the film in terms of deformability, die-cuttability and dispensability when so used are considered nominal for purposes of the present invention.

The core layer 12 for such a polymeric label 10 may, as suggested previously, comprise the entirety of the film, or may comprise an inner layer with adjacent first and/or second skin layers 14 and 18 as described above. In one embodiment, the core layer 12 as the inner layer of a three-layer film will comprise over 50% of the overall thickness of the three-layer film. In another embodiment, the core layer 12 will comprise from about 70% to about 90% of the overall thickness of the polymeric label 10. In another embodiment, the polymeric label 10 has a thickness from about 1 mil to about 10 mils. In another embodiment, the polymeric label 10 has a thickness from about 1.5 mils to about 6 mils. In another embodiment, the polymeric label 10 has a thickness from about 2 mils to about 4 mils.

In one embodiment, the polymeric label 10 is uniaxially oriented. In another embodiment, the polymeric label 10 is uniaxially oriented from about 1.1 to about 6 times in the machine direction. In another embodiment, the polymeric label 10 is biaxially oriented. In another embodiment, the polymeric label 10 is biaxially oriented from about 1.1 to about 6 times in the machine direction and from about 2 to about 10 times in the transverse direction.

In another embodiment, the first side 22 of the first skin layer 14 is printable. In one embodiment, a coating is applied to the first side 22 of the first skin layer 14. The coating may be selected from the group comprising iminated butyl-acrylate copolymer, iminated alky-acrylate copolymers, urethane copolymer coatings, and acrylonitrile copolymers.

In another embodiment, the polymeric label 10 has an elongation to break of at least about 150%.

Referring now to FIG. 4, a polymeric label 10 which is suitable for attachment to a selected substrate 24 is shown. The polymeric label 10 of the present invention as described above is shown together with an adhesive 22 which is usefully dispersed for affixing the polymeric label 10 to the substrate 24. The polymeric label 10 when used as in FIG. 4 may omit the skin layers 14 and 18, as previously noted, and consist only of a core layer 12.

In one embodiment, the adhesive 22 is selected from the group of materials characterized by the ability to form a bond with the label such that the strength of the label-adhesive interface and the substrate-adhesive interface and the cohesive strength of the adhesive 22 itself are both greater than the forces required for deformation and recovery of the label itself. These materials are essentially those adhesives 22 having the ability to cure to a high level of adhesion and cohesive strength, such that the label functions in the manner of an extension of the substrate surface, deforming and recovering with the flexing substrate 24, and such that the adhesive 22 in a given system does not itself rupture during this flexing but maintains the integrity of the system. It should be clear that it is not necessary that the adhesive function so in perpetuity, but the adhesive should be sufficient to enable the label to accomplish its intended purpose for the reasonable lifetime of a deformable container when in such use. The adhesive may or may not comprise a discrete and substantially continuous layer as shown in FIG. 4, and can be manually or mechanically applied to the polymeric label 10, the substrate 24, or both. Some possible adhesives 22 are pressure-sensitive and include the acrylic and styrene-butadiene adhesives, although any adhesive meeting the general criteria provided may be employed in the present invention. In another embodiment the adhesive 22 is a water-based or solvent-based acrylic adhesive. In another embodiment, when a clear label is used, a clear adhesive is used.

In one embodiment, the polymeric label 10 and adhesive 22 are as previously described, and the deformable substrate 24 comprises low density polyethylene, medium density polyethylene, or high density polyethylene, although within the parameters of the present invention as earlier set forth suitable labels may be prepared for other substrate materials as well, including paper and thin metal structures, for example. The label is preferably structured and comprised of such materials so that the label demonstrates the improved resistance to damage from cracking, tearing, creasing, wrinkling or shrinking due to deformation of the substrate 24 in use which is sought by the present invention.

In another embodiment, the polymeric label 10 has a tensile modulus less than the tensile modulus of the plastic container. In another embodiment, the polymeric label 10 has an elongation to break of at least about 150% in the machine direction or 150% in the transverse direction.

In another embodiment a first tie layer (not shown) is added to the polymeric label 10 between the core layer 12 and the first skin layer 14. In one embodiment the first tie layer (not shown) is a mixture of the composition of the core layer 12 and the first skin layer 14. In another embodiment, the first tie layer (not shown) comprises linear low-density polyethylene (LLDPE) grafted with maleic-anhydride. In another embodiment, the first tie layer (not shown) comprises ethylene acrylic acid copolymer (EAA). The first tie layer (not shown) may serve to improve the adhesion between the core layer 12 and the first skin layer 14. In another embodiment, a second tie layer (not shown) is added to the polymeric label 10 between the core layer 12 and the second skin layer 18. In one embodiment the second tie layer (not shown) is a mixture of the composition of the core layer 12 and the second skin layer 18. In another embodiment, the second tie layer (not shown) comprises linear low-density polyethylene (LLDPE) grafted with maleic-anhydride. In another embodiment, the second tie layer (not shown) comprises ethylene acrylic acid copolymer (EAA). The second tie layer (not shown) may serve to improve the adhesion between the core layer 12 and the second skin layer 18. The second tie layer (not shown) may have a similar composition as the first tie layer.

It should be evident that this disclosure is by way of example, and that various changes can be made by adding, modifying, or eliminating details without departing from the fair scope of the teaching contained in the disclosure. The invention therefore is not limited to particular details of this disclosure except to the extent that the claims that follow are necessarily so limited.

DEFINITION OF TERMS

As used in this application, the following terms are defined as:
1. adhesive coating—a substance which bonds together adjacent layers
2. biaxially oriented—stretched in the machine direction, the direction of the feed, and in the transverse direction, perpendicular to the feed
3. elongation to break of at least about 150%—able to be stretched to one and half its original length before it breaks
4. ethylene-propylene-butene terpolymer—a polymer made from the combination of the three monomers, ethylene, propylene, and butene
5. linear ethylene alpha-olefin copolymer—a linear polymer made from the copolymerization of ethylene monomers and alpha-olefin monomers.
6. oriented 10 times in the transverse direction—stretched a factor of 10 times perpendicular to the feed direction, e.g.—a sample 1 foot wide is stretched into a sample 10 feet wide
7. oriented 6 times in the machine direction—stretched a factor of 6 times in the feed direction, e.g.—a sample 10 feet long is stretched into a sample 60 feet long
8. polymeric—A macromolecule formed by the chemical union of five or more combining units called monomers
9. printable—a surface that is suitable for printing
10. propylene copolymer—a polymer made from the copolymerization of propylene and at least one other olefin
11. propylene-butene copolymer—a polymer made from the copolymerization of propylene and butene monomers
12. propylene-ethylene copolymer—a polymer made from the copolymerization of propylene and ethylene monomers
13. propylene-hexene copolymer—a polymer made from the copolymerization of propylene and hexene monomers
14. substrate—any material adapted to receive a label
15. squeezable container—a polymeric container having easily deformable sides with the application of a mechanical force
16. tensile modulus—a ratio of stress to strain, a measure of the softness or stiffness of a material (ASTM #D882)
17. polymeric label—a label designed to be applied to a substrate
18. thickness of 1 mil—a caliper thickness reading of 1/1000th of an inch, or 0.0254 millimeters
19. uniaxially oriented—stretched in only one direction, either machine, in the direction of the feed, or in the transverse direction, in the direction perpendicular to the feed direction

EXAMPLES

Example 1

A five layer coextruded label film structure, A/B/C/B/A, is made by tenter frame processing method. A-layer which has a thickness of 5 gauge, is an ethylene-propylene copolymer (Fina 8573®). B-layer which has a thickness of 10 gauge, is 50% by weight of an ethylene-propylene copolymer (Fina 8573®) and 50% by weight LLDPE (Dowlex 2038®) with a density of 0.933. C-layer, which has a thickness of 230 gauge, is 90% by weight LLDPE (Dowlex 2038®) with a density of 0.933 and 10% by weight of an ethylene-propylene copolymer (Fina 8573®). The label film is oriented 1.25 times in the machine direction and 9 times in the transverse direction. The elongation to break is about 900% in the machine direction and 45% in the transverse direction. The tensile modulus for the label film is about 120,000 psi in the machine direction and 130,000 psi in the transverse direction. Corona treatment is applied on both skin surfaces, A-layer. Label has pressure sensitive adhesive coating on one skin surface and laminated to silicone coated release liner.

Example 2

A five layer coextruded label film structure, A/B/C/B/A, is the same as example 1. The label film is oriented 4 times in the machine direction and 9 times in the transverse direction. The elongation to break is about 225% in the machine direction and 35% in the transverse direction. Corona treatment is applied on both skin surfaces, A-layer.

Example 3

A three layer coextruded label film structure, A/C/A, is made by tenter frame processing method. A-layer which has a thickness of 5 gauge, is an ethylene-propylene copolymer (Fina 8573®). C-layer, which has a thickness of 190 gauge, is 20% by weight LLDPE (Dowlex 2038®) with a density of 0.933 and 80% by weight of HDPE (Equistar 5045®) with a density of 0.950. The label film is oriented 1.35 times in the machine direction and 8 times in the transverse direction. The elongation to break is about 725% in the machine direction and 80% in the transverse direction. Corona treatment is applied on both skin surfaces, A-layer.

Example 4

A five layer coextruded label film structure, A/B/C/B/A, is the same as example 1. A coating is applied to the first skin surface, A-layer, of iminated butyl-acrylate copolymer (Zeneca A5090®). The coating improves UV ink printing and adhesion.

We claim:

1. A polymeric labeled container comprising:
   (1) a container;
   (2) an oriented polymeric label structure oriented in at least one direction attached to the container, comprising:
      a. a core layer comprising at least about 50% by weight of a linear ethylene alpha-olefin copolymer and at least about 5% by weight of a propylene copolymer;
      b. a first skin layer comprising a propylene copolymer; and
      c. wherein the label has an elongation to break of at least 150% in at least one direction of orientation and the label has a tensile modulus less than the tensile modulus of the container.

2. The polymeric labeled container of claim 1 wherein the label further comprises:
   a second skin layer comprising a propylene copolymer.

3. The polymeric labeled container of claim 1 wherein the linear ethylene alpha-olefin copolymer of the core layer has a density from about 0.93 to about 0.95.

4. The polymeric labeled container of claim 1 wherein the linear alpha-olefin copolymer of the core layer comprises:
   a. from about 10% to about 90% of a linear ethylene alpha-olefin copolymer with a density from about 0.93 to about 0.940; and
   b. from about 10% to about 90% of a linear ethylene alpha-olefin copolymer with a density from about 0.941 to about 0.95.

5. The polymeric labeled container of claim 4 wherein die label has a thickness from about 2 mils to about 4 mils.

6. The polymeric labeled container of claim 4 wherein the first skin layer is printable.

7. The polymeric labeled container of claim 4 wherein the label further comprises an adhesive coating between the first skin layer and the core layer.

8. The polymeric labeled container of claim 4 wherein the label is biaxially oriented in a machine direction and a transverse direction and the label has an elongation to break of at least 150% in the machine direction or the transverse direction.

9. The polymeric labeled container of claim 8 wherein die label has an elongation to break of at least about 150% in the machine direction.

10. The polymeric labeled container of claim 8 wherein the label has an elongation to break of at least about 150% in the transverse direction.

11. The polymeric labeled container of claim 8 wherein the propylene copolymer of the core layer is selected from the group consisting of propylene-ethylene copolymer, propylene-butene copolymer, ethylene-propylene-butane terpolymer, propylene-hexene copolymer, and mixtures thereof.

12. The polymeric labeled container of claim 11 wherein the propylene copolymer of the first skin layer is selected from the group consisting of propylene-ethylene copolymer, propylene-butane copolymer, ethylene-propylene-butane terpolymer, propylene-hexene copolymer, and mixtures thereof.

13. The polymeric labeled container of claim 12 wherein the propylene copolymer of the second skin layer is selected from the group consisting of propylene-ethylene copolymer, propylene-butene copolymer, ethylene-propylene-butene terpolymer, propylene-hexene copolymer, and mixtures thereof.

14. The polymeric labeled container of claim 13 further comprising an adhesive coating on the second skin layer.

15. The polymeric labeled container of claim 12 wherein the label has an elongation to break of at least 225% in the machine direction.

16. The polymeric labeled container of claim 15 wherein the label has a tensile modulus in the machine direction no greater than 120,000 psi.

17. The polymeric labeled container of claim 16 wherein the label has a 35 tensile modulus in the transverse direction no greater than 130,000 psi.

18. The polymeric labeled container of claim 17 wherein the label has a thickness from about 1 mil to about 10 mils.

19. The polymeric labeled container of claim 17 wherein the label has a thickness from about 1.5 mils to about 6 mils.

20. The polymeric labeled container of claim 19 herein die label is oriented from about 1.1 to about 6 times in the machine direction.

21. The polymeric labeled container of claim 20 wherein the label is oriented from about 1.1 to about 6 times in the machine direction and from about 2 to about 10 times in the transverse direction.

22. A labeled container comprising:
(1) a deformable plastic container;
(2) an oriented polymeric label structure oriented in at least one direction attached to the container, comprising:
  a. a core layer comprising at least about 50% by weight of a linear ethylene alpha-olefin copolymer and at least about 5% by weight of a propylene copolymer;
  b. a first skin layer comprising a propylene copolymer; and
  c. wherein the label has an elongation to break of at least 150% in at least one direction of orientation and the label has a tensile modulus less than the tensile modulus of the deformable container.

23. The labeled container of claim 22 wherein the linear alpha-olefin copolymer of the core layer comprises:
  a. from about 10% to about 90% of a linear ethylene alpha-olefin copolymer with a density from about 0.93 to about 0940; and
  b. from about 10% to about 90% of a linear ethylene alpha-olefin copolymer with a density from about 0.941 to about 0.95.

24. The labeled container of claim 23 wherein the label is biaxially oriented in a machine direction and a transverse direction and the label has an elongation to break in the machine direction or the transverse direction of at least 150%.

25. The polymeric label of claim 24 wherein the label has an elongation to break of at least about 150% in the machine direction.

26. The polymeric label of claim 24 wherein the label has an elongation to break of at least about 150% in the transverse direction.

27. A polymeric labeled container comprising:
(1) a deformable plastic container;
(2) a polymeric label structure oriented in at least one direction attached to the container, comprising:
  a. a core layer comprising at least about 50% by weight of a linear ethylene alpha-olefin copolymer and at least about 5% by weight of a propylene copolymer,
  b. a first transition layer comprising a material selected from the group consisting of a linear ethylene alpha-olefin copolymer; a propylene copolymer; LLDPE grafted with maleic-anhydride; ethylene acrylic acid copolymer; and mixtures thereof;
  c. a first skin layer comprising a propylene copolymer; and
  d. wherein the label has an elongation to break of at least 150% in at least one direction of orientation and the label has a tensile modulus less than the tensile modulus of the container.

28. A polymeric labeled container of claim 27 wherein the linear alpha-olefin copolymer of the core layer comprises:
  a. from about 10% to about 90% of a linear ethylene alpha-olefin copolymer with a density from about 0.93 to about 0.940; and
  b. from about 10% to about 90% of a linear ethylene alpha-olefin copolymer with a density from about 0.941 to about 0.95.

29. The polymeric labeled container of claim 28 further comprising:
  a. a second transition layer comprising a material selected from the group consisting of a linear ethylene alpha-olefin; a propylene copolymer; LLDPE grafted with mono-anhydride; ethylene acrylic acid copolymer, and mixtures thereof; and
  b. a second skin layer comprising a propylene copolymer.

30. The polymeric labeled container of claim 29 further comprising:
  a coating on the first skin layer comprising a material selected from the group consisting of iminated butyl-acrylate copolymer, iminated alky-acrylate copolymers, urethane copolymer coatings, acrylonitrile copolymers, and mixtures thereof.

* * * * *